May 27, 1969     D. R. HAMILTON ET AL     3,447,069
LIGHT RESPONSIVE PHASE SHIFTING CIRCUITRY
Filed Dec. 1, 1966
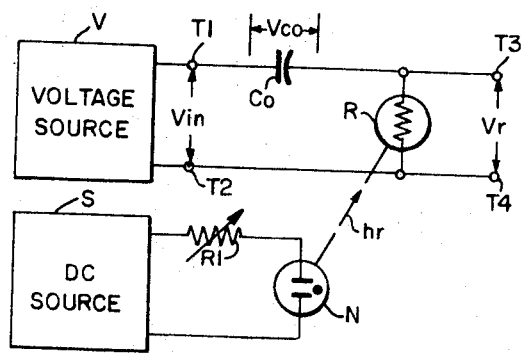
FIG. 1
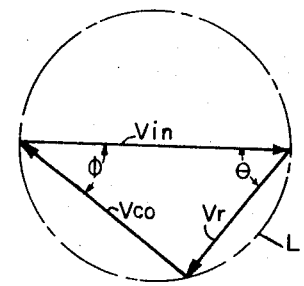
FIG. 2
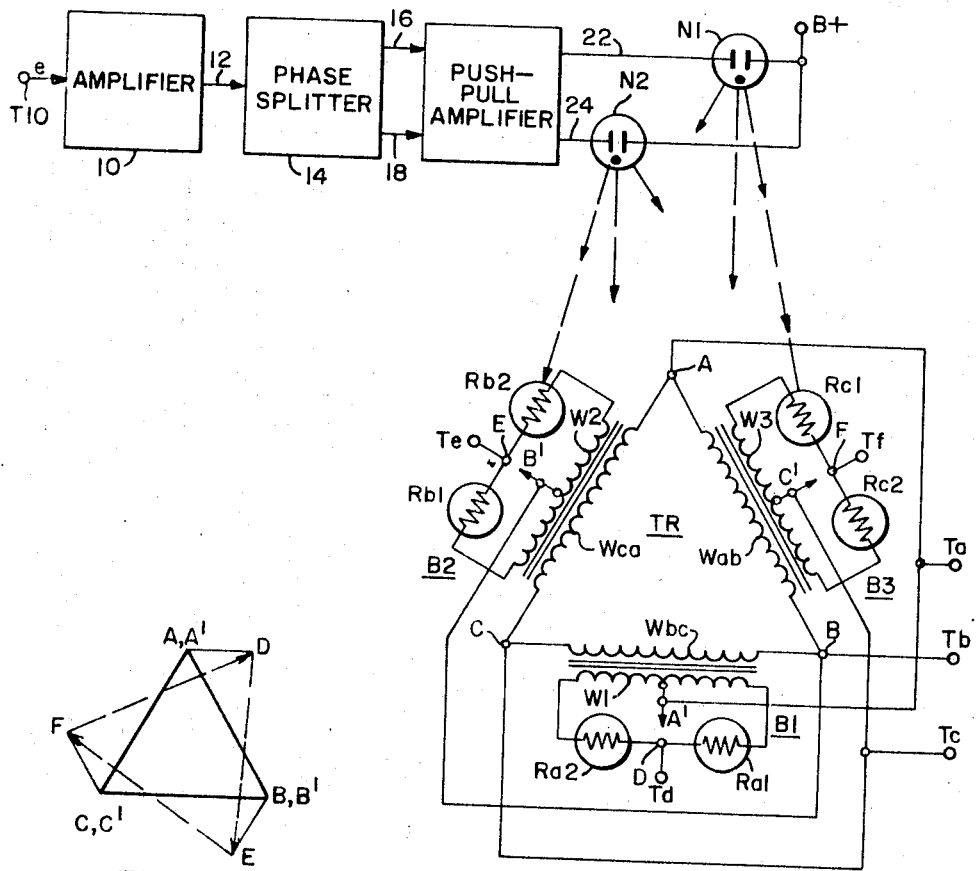
FIG. 4
FIG. 3
WITNESSES
Helen M. Barbas
James F. Young
INVENTORS
Donald R. Hamilton &
Paul R. Malmberg
BY
ATTORNEY United States Patent Office 3,447,069
Patented May 27, 1969

3,447,069
LIGHT RESPONSIVE PHASE SHIFTING CIRCUITRY
Donald R. Hamilton, Turtle Creek, and Paul R. Malmberg, Pittsburgh, Pa., assignors to Westinghouse Electric Corporation, Pittsburgh, Pa., a corporation of Pennsylvania
Filed Dec. 1, 1966, Ser. No. 598,469
Int. Cl. G05f 3/02
U.S. Cl. 323—122                    8 Claims

ABSTRACT OF THE DISCLOSURE

Light responsive phase shifting circuitry is disclosed wherein the phase of the voltage developed across a light dependent resistor is made controllable with respect to a reference phase by irridating the resistor, with a phase shift device such as a capacitor being used to provide a fixed phase shift with respect to the voltage developed across the light dependent resistor.

---

The present invention relates to phase shifting systems and, more particularly, to phase shifting systems wherein phase may be controllably and continuously varied.

In many control systems applications it is necessary to shift the phase of an alternating voltage continuously in response to an analog function, for example, a mechanical motion or in proportion to a control signal. A typical manner of obtaining a controlled phase shift is to add two voltages that differ in phase by a fixed amount to obtain a third voltage of the desired phase. When continuous phase variation is desired, transformers and Variacs, or saturable core reactors have been utilized to obtain this. Also, it is possible to use resistive potentiometers as two arms of a bridge circuit placed across the winding of an appropriate isolation transformer. An example of the latter type reflects the plate resistance of a vacuum tube into the secondary of a transformer to use the reflected resistance as one arm of an alternating current bridge. The other arm of the bridge is provided by the reflected resistance of a fixed resistor. The relative balance of the two arms of the bridge circuit may thus be controlled through the grid voltage of the vacuum tube since the plate resistance of a vacuum tube is a function of its grid voltage. An alternating signal having a continuously variable amplitude may thus be drawn from the center of the bridge and the center tap of the secondary transformer. This, when added in quadrature to a second invariant AC voltage yields a resultant whose phase is variable. The just described system provides the desired features of continuous control and isolation of the control signal from the alternating voltages. However, such a system has the apparent disadvantages of being relatively complex and expensive, and, moreover, requires the use of a vacuum tube which is subject to failure.

It is therefore an object of the present invention to provide new and improved controllable phase shifting circuitry.

It is a further object to provide new and improved controllable phase shift circuitry which is optically controlled.

It is a further object to provide controllable phase shift circuitry which is continuously controllable in response to input control signals.

Broadly, the present invention provides controllable phase shift circuitry operative with a source of reference potential, wherein a light responsive device is utilized for developing a voltage having a controllable phase relationship with respect to the reference potential. A phase shifting device is provided for developing a second voltage having a fixed phase relationship with respect to the voltage developed across the light responsive device. By irradiating the light responsive device, the phase relationship of the voltage across the light responsive device may be varied with respect to the reference potential in response to the quantity of light applied to the light responsive device.

These and other objects and advantages of the present invention will become more apparent when considered in view of the following specification and drawings, in which:

FIGURE 1 is a schematic diagram of one embodiment of the present invention;
FIG. 2 is a vector diagram used in the explanation of the operation of the circuit of FIG. 1;
FIG. 3 is a schematic-block diagram of another embodiment of the present invention; and
FIG. 4 is a vector diagram used in explaining the operation of the circuitry of FIG. 3.

Referring first to FIGS. 1 and 2, the phase shifting circuit shown in FIG. 1 is designed to be capable of shifting the output voltage Vr of the circuitry with respect to the input voltage Vin thereto. The circuit of FIG. 1 includes a voltage source V which supplies an alternating voltage Vin between terminals T1 and T2. The voltage Vin is of a fixed magnitude and phase and is shown as the vector Vin in FIG. 2. A capacitor Co is connected between the input terminal T1 and the output terminal T3. The capacitor Co operates as a phase shifting device within the circuit. Between the output terminal T3 and an output terminal T4 is connected a light responsive device R which may comprise a light dependent resistor whose resistance varies as a function of the quantity of light applied thereto. The terminals T2 and T4 are commonly connected. Examples of light dependent resistors that can be used in the present circuitry are: Delco LDR-25, Clairex CL5D5L, CL5D4 and CL5D4L; the first two being cadmium sulfide cells and the latter two being cadmium selenide cells.

The output voltage for the circuit is developed between the terminals T3 and T4 and is indicated as the voltage Vr. The voltage Vr is shown vectorially in FIG. 2 as the vector Vr and is established at an angle $\theta$ with respect to the input voltage Vin. The voltage developed across the capacitor Co is a voltage Vco and is indicated in FIG. 2 as the vector Vco. The voltage Vco across the capacitor has a fixed phase angle with respect to the voltage Vr across the light dependent resistor R of 90°.

Between the reference input voltage Vin and the capacitor voltage Vco a phase angle $\varphi$ is established. To vary the phase relationship between the input voltage Vin and the output voltage Vr, that is, to vary the angle $\theta$, the magnitude of the resistance developed by the light dependent resistor R is varied. By varying the magnitude of the resistance R, the angle $\theta$ between the vectors Vin and Vr may be continuously varied to define the circular locus L as shown in FIG. 2. Since a fixed phase relationship of 90° is defined between the vectors Vr and Vco, the control of the magnitude of the light dependent resistor R acts as the controlling element for the phase shift between the input voltage Vin and the output voltage Vr.

To vary the resistance value of the light dependent resistor R, a light source circuit is provided. The light source circuit includes a DC source S which provides a direct output voltage and may for example comprise a battery. A variable resistor R1 is connected in series with a neon bulb N with the series combination being connected across the output of the DC source S. By varying the resistance value of the variable resistor R1, the light output (hr) of the neon bulb N may thus be controlled. Alternately, the voltage output of the DC source S may be changed to vary the activation of the neon bulb N. The neon bulb N is disposed so that its light output (hr) irradiates the light dependent resistor R. By thus controlling the magnitude of the light output $hr$ from the neon bulb N, the amount of irradiation supplied to the light dependent resistor R and thus its resistance value may be varied accordingly. The phase angle $\theta$ between the reference input voltage V$in$ and the voltage V$r$ developed across the light dependent resistor R is hence controlled in response and in proportion to the quantity of light supplied to the light dependent resistor R. The light source circuit is optically coupled to the light dependent resistor R and thus is electrically isolated therefrom. The magnitude of the light output ($hr$) from the neon bulb N may be made proportional to some physical quantity for which it is desired to provide a phase shift $\theta$ in response thereto.

FIG. 3 shows a three-phase, phase shifting system wherein a three-phase output voltage is provided having a continuously variable phase relationship with respect to a three-phase input voltage. FIG. 4 shows a vector diagram of the three-phase input and output voltages, the input vectors being designated ABC and the output vectors being designated DEF. The input three-phase voltage is supplied from a three-phase source, not shown, and is applied to terminals T$a$, T$b$, and T$c$. The terminals T$a$, T$b$ and T$c$ are, respectively, connected to points A, B and C at the corners of a delta connected primary winding of a three-phase transformer TR. The transformer TR includes a primary winding W$ab$ connected between the points A and B, a primary winding W$bc$ connected between the points B and C and a primary winding W$ca$ connected between the points C and A. Transformer TR also includes a secondary winding W1 inductively coupled to the winding W$bc$, a secondary winding W2 inductively coupled to the winding W$ca$ and a secondary winding W3 inductively coupled to the winding W$ab$. The terminal T$a$ is also connected to a center tap point A' of the winding W1; the terminal T$b$ is connected to the center tap point B' of the winding W2 and the terminal T$c$ is connected to the center tap point C' of the winding W3.

The phase and magnitude of the input voltages developed respectively across the windings W$ab$, W$bc$ and W$ca$ is shown in the vector diagram of FIG. 4, with the vectors AB, BC and CA so indicating phase voltages respectively.

A pair of light dependent resistors R$a$1 and R$a$2 are connected in series across the secondary winding W1. A junction point D is formed between the light dependent resistors R$a$1 and R$a$2 with an output terminal T$d$ being connected thereto. A pair of light dependent resistors R$b$1 and R$b$2 are connected in series across the secondary winding W2, with a junction point E being formed therebetween and an output terminal T$e$ connected thereto. A pair of light dependent resistors R$c$1 and R$c$2 are connected in series across the secondary winding W3, with a junction point F being formed therebetween and an output terminal T$f$ connected thereto.

The magnitude of phase relationship of the three-phase output voltage developed at the output terminals T$d$, T$e$ and T$f$ as shown in FIG. 4, with the vector DE representing the voltage between the terminals T$d$ and T$e$, the vector EF representing the voltage between the terminals T$e$ and T$f$ and the vector FD representing the voltage between the terminals T$f$ and T$d$. It can be seen from FIG. 4 that a predetermined phase relationship exists between the ABC vectors and the DEF vectors. This phase relationship may be controlled by the selection of the resistance values of the light dependent resistor pairs R$a$1–R$a$2, R$b$1–R$b$2 and R$c$1–R$c$2. By controlling the resistance values of the light dependent resistor pairs, the magnitude of the vectors A'D, B'E and C'F can be controlled to thereby vary the phase relationships of the three-phase output with respect to the three-phase input voltages. It should be noted that the center tap points A', B' and C' of the secondary windings W1, W2 and W3, respectively are held at the input reference points A, B and C.

The center tapped secondary windings W1, W2 and W3 and their corresponding pairs of light dependent resistors R$a$1–R$a$2, R$b$1–R$b$2 and R$c$1–R$c$2 with a tap point therebetween form three bridge circuits B1, B2 and B3, respectively. When the resistance value of each of the light dependent resistors is equal, the bridge will be in a balanced state with zero voltage being provided between the points A'–D, B'–E and C'–F. Any difference in the resistance value between the respective light dependent resistors of each of the pairs will result in an output being developed between the points A'–D, B'–E and C'–F; thus shifting the phase of the output voltage DEF with respect to the fixed reference input voltage ABC.

The control of the magnitude of the resistances of the light dependent resistor pairs R$a$1–R$a$2, R$b$1–R$b$2 and R$c$1–R$c$2 is effected by a push-pull light source circuit. This circuit includes an amplifier 10 which has supplied thereto an input signal $e$ at an input terminal T10. The input signal $e$ may be any analog signal in response to which a phase variation from the reference three-phase input ABC is desired. The amplifier 10 supplies an alternating and amplified output proportional to the input signal $e$ applied thereto. This output is supplied at an output lead 12 and is, in turn, applied to a phase splitter 14. The phase splitter 14 splits the phase of the input signal thereto into equal positive and negative signals. These respective signals from the phase splitter 14 are supplied as driving inputs 16 and 18 for a push-pull amplifier 20. The push-pull amplifier 20 is operative to supply the driving energy for a pair of neon bulbs N1 and N2. The neon bulb N1 has one end connected to a output 22 of the push-pull amplifier 20 and its other end connected to a terminal B+ to which a source of direct potential is applied. The neon bulb N2 is connected between the other output 24 of the push-pull amplifier 20 and the B+ terminal. The push-pull amplifier 20 is operative to supply outputs at leads 22 and 24 which are 180° out of phase with each other. Thus, when the neon bulb N1 is activated to the maximum illumination, the neon bulb N2 is activated to a state of minimum illumination. In other words, the quantity of light emitted by the neon bulbs N1 and N2, respectively, are 180° out of phase with each other. The relative magnitude of illumination from the bulbs N1 or N2 is determined by the magnitude of the input signal $e$ supplied at the input of the light source circuitry.

The neon bulb N1 is disposed physically to irradiate only the light dependent resistors R$a$1, R$b$1 and R$c$1, while the neon bulb N2 is disposed physically to irradiate only the light dependent resistors R$a$2, R$b$2 and R$c$2. The light dependent resistor pairs R$a$1–R$a$2, R$b$1–R$b$2 and R$c$1–R$c$2 are thus operated in a push-pull fashion with the quantity of light supplied respectively to each resistor of the pair being 180° out of phase. Thus, when the resistors R$a$1, R$b$1 and R$c$1 are receiving maximum light, the resistance R$a$2, R$b$2 and R$c$2 receive minimum light, and vice versa. The push-pull operation of the light dependent resistor pairs permits an enhanced deviation in the resistance values of the light dependent resistance of the pairs. This thus increases the output from the respective bridge circuits B1, B2 and B3 including the secondary windings W1, W2 and W3 and the associated light dependent resistor pairs R$a$1–R$a$2, R$b$1–R$b$2 and R$c$1–R$c$2. In other words, as the magnitude of the resistance of the dependent resistors R$a$1, R$b$1 and R$c$1 is increasing, the magnitude of the resistance of the resistors R$a$2, R$b$2 and R$c$2 is decreasing, thereby increasing the unbalanced state of the associated bridge circuit to provide a relatively large output voltage from each of the respective bridge circuits B1, B2 and B3.

The relative degree of unbalance of the respective bridge circutis B1, B2 and B3 determines the degree of phase shift of the output three-phase voltage DEF with respect to the input reference voltage ABC. This can be seen in FIG. 4 with the vectors A'D, B'E and C'F defining the respective output voltages of the bridge circuits B1, B2 and B3. The light output of the neon bulbs N1 and N2 being proportional to the magnitude of the input signal $e$, the magnitude of phase shift of the output three-phase voltage DEF with respect to the input voltage ABC is thus proportional to the magnitude of the input signal $e$. The use of the push-pull arrangement for the neon bulbs N1 and N2 to activate respective ones of the pair of light dependent resistor thus enhances the sensitivity of the phase shift to relatively small changes in the input signal level $e$.

We claim as our invention:

1. A controllable phase shift circuit operative with a source of reference potential comprising:
   a light responsive device coupled to said source for developing a first voltage thereacross having a controllably variable phase relationship with respect to said reference potential;
   a phase shift device connected between said source and said light responsive device for developing a second voltage thereacross having a fixed phase relationship with respect to said first voltage; and
   light means for irradiating said light responsive device to vary the phase of said first voltage with respect to said reference potential in response to the quantity of light supplied to said light responsive device.

2. The circuit of claim 1 wherein:
   said light responsive device comprises a light dependent resistor whose resistance varies in response to the quantity of light supplied thereto.

3. The circuit of claim 2 wherein:
   said phase shift device comprises a capacitor connected in series with said light dependent resistor so that said second voltage has a controllably variable phase relationship with respect to said reference potential and a quadrature phase relationship with respect to said first voltage.

4. The circuit of claim 3 wherein:
   said light means comprises a neon bulb disposed in such a position to irradiate said light dependent resistor and whose light output is controllable.

5. A controllable phase shift system operative with a polyphase source comprising:
   phase defining means for defining a reference phase for each phase of said polyphase source;
   a pair of light responsive devices operatively connected to said phase defining means and having an output point therebetween, with an output voltage being developed between respective output points; and
   light means for irradiating said pair of light responsive devices to vary controllably the phase of said output voltages with respect to said reference phase.

6. The system of claim 5 wherein:
   said phase defining means comprises polyphase transformer including a primary winding coupled to each phase of said polyphase source and a secondary winding inductively coupled to each of said primary windings,
   said pair of light responsive devices comprising a pair of light dependent resistors connected in series across said second winding with said output point being formed there between the series pair.

7. The system of claim 6 wherein:
   said light means includes a pair of light sources operated in push-pull fashion and disposed to irradiate respectively one of said pair of light responsive resistors in each of said phases.

8. The system of claim 7 wherein:
   said pair of light sources providing a light output proportional to an input applied to said light means.

References Cited

UNITED STATES PATENTS 3,315,153  4/1967  Whatley _____ 323—75

JOHN F. COUCH, *Primary Examiner.*

G. GOLDBERG, *Assistant Examiner.*

U.S. Cl. X.R.

250—204, 206